W. LUYKEN.
ELECTRIC MOTOR.
APPLICATION FILED DEC. 13, 1913.

1,204,290.

Patented Nov. 7, 1916.

Witnesses:
J. M. Wynkoop.
A. B. Chinn.

Inventor,
Wilhelm Luyken,
By Knight Bros.
Attorneys.

UNITED STATES PATENT OFFICE.

WILHELM LUYKEN, OF ESSEN-ON-THE-RUHR, GERMANY, ASSIGNOR TO FRIED. KRUPP AKTIENGESELLSCHAFT, OF ESSEN-ON-THE-RUHR, GERMANY.

ELECTRIC MOTOR.

1,204,290.  Specification of Letters Patent.  Patented Nov. 7, 1916.

Application filed December 13, 1913.  Serial No. 806,548.

*To all whom it may concern:*

Be it known that I, WILHELM LUYKEN, residing at Essen-on-the-Ruhr, Germany, a subject of the Emperor of Germany, have invented a certain new and useful Improvement in Electric Motors, of which the following is a specification.

This invention relates to a device for transforming a periodically variable motion of low energy into one of greater energy following a similar law, and its object is to attain, as far as possible, a complete conformity of the laws according to which the two motions occur.

Figure 1:
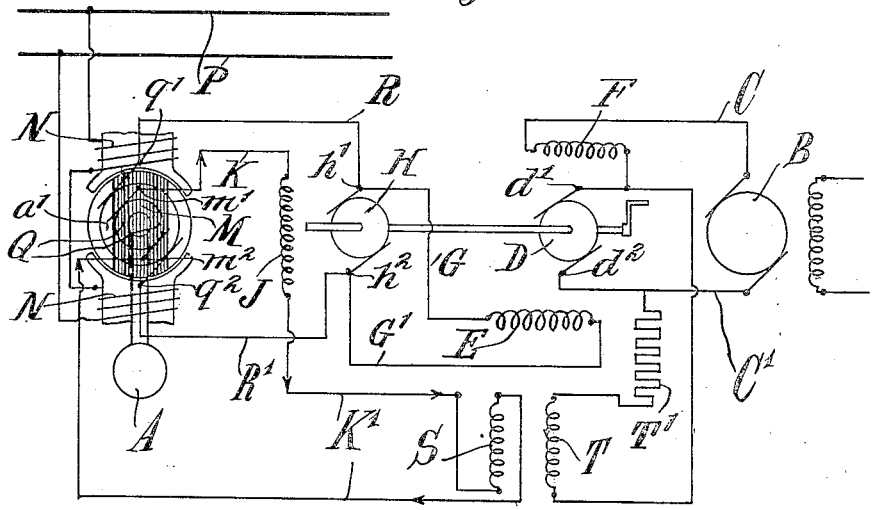
Figure 2:
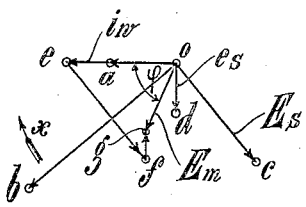

Two embodiments of the invention have been illustrated in the accompanying drawing, and it has been supposed that the periodically variable motion in both embodiments consist of an approximately sinusoidal oscillation and Figure 1 shows a diagrammatic representation of the first embodiment; Fig. 2 a vector diagram illustrating the operation thereof; and Fig. 3 a diagrammatic representation of the second embodiment of the invention.

The embodiment illustrated in Figs. 1 and 2 will first be described.

The periodically variable motion of low energy which is going to be transformed consists in the movement of a pendulum A, which is driven by for instance a clock work, not shown.

For generating the corresponding, periodically variable, motion of greater energy, a separately excited electric motor is used, constructed as a continuous current machine, which is intended for driving a pivoted body, the oscillating movement of which is to coincide with that of the pendulum. The armature B of the motor is connected, using the well known Leonard connection, by means of conductors C and $C^1$ with the terminals $d^1$ and $d^2$ of the armature D of a controlling generator running as far as possible with uniform speed. The controlling generator, which is made as far as possible free from residual magnetism, is provided with a main field winding E and a compound winding F situated in the conductor C. The main winding E of the controlling generator is connected through conductors G and $G^1$ to the terminals $h^1$ and $h^2$ of an exciting machine H, also as far as possible being free from remanence, the magnetic saturation of said main field winding being kept so small that its field strength may be considered proportionate with the exciting current strength and therefore the self induction coefficient of the exciting windings E and F may be considered as constant. This machine possesses a field winding J which is connected by means of conductors K and $K^1$ to the terminals $m^1$ and $m^2$ of an armature winding M of a generator, the armature $a^1$ of which is rigidly connected with a pendulum A, the stator of said generator being provided with an exciting winding N which is fed by a continuous current line P; and the armature of the machine being suitably arranged on the same shaft as the armature D of the controlling generator. The exciting machine H has also such slight magnetic saturation that its field strength may be considered as proportionate to the exciting strength, and the self induction coefficient of the exciting winding J may therefore be considered as constant. On the armature $a^1$ on both sides of the armature winding M, being arranged as a drum winding, is provided a second drum winding Q the terminals $q^1$ and $q^2$ of which are connected through conductors R and $R^1$ to the armature terminals $h^1$ and $h^2$ of the exciting machine. As the alternating current generated through the oscillation of the pendulum A in the circuit M K J $K^1$ now will generate a voltage at the terminals $h^1$ and $h^2$ of the exciting machine, the phase of which is almost completely in accordance with that of the alternating current, and this voltage considerably exceeds the voltage induced in the drum winding Q; it will then be possible by suitable connection of the conductors R and $R^1$ to the terminals $h^1$ and $h^2$ to attain that an alternating current will appear in the circuit Q R $R^1$, which will have approximately the opposite phase to the current in the circuit M K J $K^1$. If therefore the number of turns in the winding Q be suitably chosen, the alternating current in the circuit Q R $R^1$ can exert upon the armature $a^1$ a torque, which approximately counteracts the torque which is created by the current flowing in the winding M. If the ratio, as now supposed, is selected in the above named manner the oscillation of the pendulum A will then practically not be influenced by the induction. In the conductor $K^1$ is moreover a secondary winding S of a transformer inserted in such a manner that the positive direction of the secondary electro-motive force is opposite to the positive direction of the electromotive force in the circuit M K J $K^1$ S; and the primary winding T of the transformer having series-connection with a comparatively great non-inductive series resistance $T^1$, is connected with the terminals $d^1$ and $d^2$ of the armature D of the controlling generator. The magnetic saturation of the transformer is also kept comparatively small, so that the field strength at any instant is practically proportionate with the resultant ampere-turns of the primary and secondary windings.

In operating this device an alternating voltage is generated through the oscillation of the pendulum A in the winding M of the armature $a^1$, which voltage at any instant is proportionate with the angular velocity of the pendulum, and the phase of which is in accordance with the phase of the angular velocity of the pendulum. An alternating current will therefore appear in the circuit M K J $K^1$ S that in consequence of the slight magnetic saturation of the exciting machine H and the transformer S T, follows a law which coincides with the law of the angular velocity of the pendulum, if the phase displacement is left out of consideration. In flowing through the exciting winding J of the exciting machine H, this alternating current generates in the armature H an alternating voltage, which is considerably greater than the voltage generated in the armature winding M. An alternating current of increased strength will therefore appear in the circuit G E $G^1$, which in its turn will generate an alternating voltage in the armature D, when flowing over the exciting winding E of the controlling generator. This alternating voltage is considerably greater than the voltage generated in the armature of the exciting machine H.

Under the action of the alternating voltage of the controlling generator a still more intensified alternating current will appear in the circuit C F B $C^1$ which can give the motor armature B a movement of considerable energy, which will turn the motor alternately in one and the other direction so that the pivoted body which the motor serves to drive will receive an oscillating movement. It will be evident that the law of this oscillation coincides with the law of the alternating current in the circuit M K J $K^1$ S, as a consequence of the slight magnetic saturation of the controlling generator and the exciting machine H, the phase displacement again not being taken into consideration.

The phase of the angular velocity of the motor lags behind the phase of the terminal voltage of the controlling generator as a consequence of the inertia of the masses. Now, as the phase of this terminal voltage must approximately be in accordance with the phase of the alternating current in the circuit G E $G^1$, and the phase of this alternating current, in consequence of the self-induction of the main field winding E, lags behind the phase of the electromotive force of the exciting machine H, and of the alternating current of the circuit M K J $K^1$ S running in the same phase with the former, the phase of the angular velocity of the motor must lag behind that of the last named alternating current. Shall now the phase of the angular velocity of the motor be in accordance with the phase of the angular velocity of the pendulum A, as is necessary to get the law of the oscillating movement generated by the motor to coincide with the law which the oscillating movement of the pendulum follows; then the alternating current of the circuit M K J $K^1$ S must be so much in the lead of the electromotive force as the phase of the angular velocity of the motor lags behind the phase of the alternating current, which is generated in the armature winding M and runs with the same phase as the angular velocity of the pendulum A. This can now be attained by means of the transformer ST.

The primary current strength of the transformer lags behind the terminal voltage of the controlling generator which also forms the terminal voltage of the primary circuit, the angle of lag being comparatively small due to the high value of the series resistance $T^1$. The terminal voltage of the controlling generator lags behind the alternating current of the circuit M K J $K^1$ S as has already been said. The primary current intensity will therefore all the more lag behind this current.

In the vector diagram shown in Fig. 2 wherein the angle is counted in the direction as the clock runs as indicated by the arrow $x$, the vector of the primary current strength will coincide with the line $o\ b$, when the vector of the alternating current of the circuit M K J $K^1$ S is expressed by the line $o\ a$.

The primary electromotive force of the transformer is naturally considerably greater than the secondary force, and as a consequence the primary number of turns must therefore be considerably greater than the secondary number of turns. As naturally also the primary current strength is considerably greater than the secondary one so must also the primary ampere-turns be considerably greater than the secondary ones. It may therefore be considered with great approximation that the phase of the field strength of the transformer is in accordance with the phase of the primary ampere-turns or current strength. The secondary electromotive force, which will be denoted by $E_s$, lags 90° behind the field strength, and therefore also approximately the same amount behind the primary current strength. The vector of $E_s$ will therefore coincide with the line $o\ c$ in the vector diagram, which line forms an angle of 90° with the line $o\ b$. If now the electromotive force, induced in the armature M by the oscillation of the pendulum A, is denoted by $E_m$, and the self-induction of the winding J by $e_s$, the current strength in the circuit M K J K¹ S by $i$ and the ohmic resistance by $w$, and considering the fact that the electromotive forces $E_m\ E_s$ are oppositely connected, we will therefore have at any instant the following equations:

$$\overline{E}_m + \overline{e}_s - \overline{E}_s = \overline{i}.w.$$

or $$\overline{E}_m = \overline{i}.w + \overline{E}_s - \overline{e}_s.$$

In the vector diagram the vector of the self-induction $e_s$ lags 90° behind the vector $o\ a$ of the current strength $i$, and is denoted by the line $o\ d$ (at 90° to line $o\ a$), the magnitudes $E_m$, $E_s$, $e_s$ and $i$ being considered as of maximum value or as of effective value. If now, in accordance with the last given equation, a line $o\ e = i\ w$ is drawn in a direction of the vector $o\ a$, then from the end point $e$ of this line a line $e\ f = E_s$ is drawn in the direction of $o\ c$, and lastly from $f$ in opposite direction to $o\ d$, a line $f\ g = e_s$ is drawn, the line $o\ g$ will then represent the vector of $E_m$. As shown by this vector diagram the current strength $i$ represented by the vector $o\ a$ leads the electromotive force $E_m$ represented by the vector $o\ g$ by the angle $\varphi$, and also leads the angular velocity of the pendulum A by the same angle since said angular velocity is in phase with the electromotive force $E_m$. By suitable selection of the ratio it will now be possible to make the angle $\varphi$ just as large as the angle by which the phase of the angular velocity of the motor lags behind the phase of the current strength $i$, so that the angular velocity of the motor receives the same phase as the pendulum A and that consequently the law of oscillation motion generated by the motor also coincides with the law of oscillation motion of the pendulum relative to its phase too.

It will be self-evident that between the generator A $a^1$ M N and the controlling generator, other exciting machines may be inserted besides the exciting machine H, each of these exciting machines being excited by the next preceding one.

Figure 3:
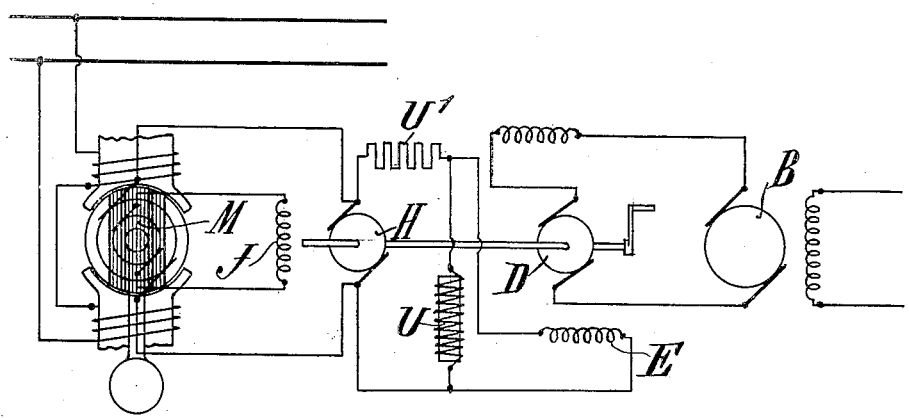

The second embodiment of the invention illustrated in Fig. 3 differs from the first one only thereby that in place of the transformer for adjusting the phase, a choking coil $u$, connected in parallel with the field winding E of the controlling generator, is used together with a comparatively great non-inductive resistance $u^1$ which is connected in series to the current branch containing the choking coil and the field winding.

The terminal voltage of the exciting machine H runs approximately in the same phase as the alternating current in the winding J. The latter lags behind the electromotive force generated in the armature winding M as a consequence of the self-induction of the winding J, the phase of this electromotive force coinciding with the angular velocity of the pendulum A. The phase of the terminal voltage of the exciting machine H also lags behind the phase of the angular velocity of the pendulum A. By proper selection of the impedance of the choking coil U, and the series resistance $U^1$ it will now be possible to attain that the phase of the alternating current in the winding E leads not only the phase of the terminal voltage in the exciting machine H, but also the phase of the angular velocity of the pendulum A. The phase of the angular velocity of the motor lags, in consequence of the inertia, behind the phase of the terminal voltage of the controlling generator, and of the phase of the alternating current in the field winding E, the two phases being approximately in accordance. If now the angle by which the phase of this alternating current leads the phase of the angular velocity of the pendulum A, has been so selected that it equals the angle by which the phase of the angular velocity of the motor lags behind the phase of the alternating current, the oscillating motion generated by the motor will then take place in the same phase as the oscillating motion of the pendulum; so that both oscillation motions coincide completely relatively to their laws of motion.

I claim:

1. Device for transforming a periodically variable motion of small energy to a motion of great energy both following similar laws; comprising an electric generator and means for driving the armature of said generator in accordance with said first motion, a circuit conducting the current generated in said armature, a separately excited electric motor for producing said second motion, a controlling generator of low magnetic saturation, the armature winding of said controlling generator being connected to the armature winding of said motor; said controlling generator being provided with a field winding excited by current dependent on the electromotive force of the armature of the first-named generator; and means for so displacing the phase of the current in said winding, that the phase of this current is in advance of the electromotive force generated in the armature of said first-named generator.

2. Device for transforming a periodically variable motion of small energy to a motion of great energy both following similar laws; comprising an electric generator and means for driving the armature of said generator in accordance with said first motion, a circuit conducting the current generated in said armature, a separately excited electric motor for producing said second motion, a controlling generator of low magnetic saturation, the armature winding of said controlling generator being connected to the armature winding of said motor; said controlling generator being provided with a field winding excited by current dependent on the electromotive force of the armature of the first-named generator, means for so displacing the phase of the current in said winding that the phase of this current is in advance of the electromotive force generated in the armature of said first-named generator, said first-named generator being provided with a field winding separately excited from a direct current network, and with an open armature winding and slip rings, the ends of said armature winding being connected to said slip rings.

3. Device for transforming a periodically variable motion of small energy to a motion of great energy both following similar laws; comprising an electric generator and means for driving the armature of said generator in accordance with said first motion, a circuit conducting the current generated in said armature, a separately excited electric motor for producing said second motion, a controlling generator of low magnetic saturation, the armature winding of said controlling generator being connected to the armature winding of said motor; said controlling generator being provided with a field winding excited by current dependent on the electromotive force of the armature of the first-named generator, means for so displacing the phase of the current in said winding, that the phase of this current is in advance of the electromotive force generated in the armature of said first-named generator, said first-named generator being provided with a field winding separately excited from a direct current network, and with an open armature winding and slip rings, the ends of said armature winding being connected to said slip rings and the armature of said first-named generator being provided with a second winding connected to the armature of said controlling generator for compensating the torque absorbed by said first armature winding.

4. Device for transforming a periodically variable motion of small energy to a motion of great energy both following similar laws; comprising an electric generator and means for driving the armature of said generator in accordance with said first motion, a circuit conducting the current generated in said armature, a separately excited electric motor for producing said second motion, a controlling generator of low magnetic saturation, the armature winding of said controlling generator being connected to the armature winding of said motor; said controlling generator being provided with a field winding excited by current dependent on the electromotive force of the armature of the first-named generator; and a transformer having a primary and a secondary winding and a non-inductive resistance, said primary winding and said resistance being connected in series to each other and to the armature of said controlling generator, and said secondary winding being inserted in said circuit containing said exciting winding.

5. Device for transforming a periodically variable motion of small energy to a motion of great energy both following similar laws; comprising an electric generator and means for driving the armature of said generator in accordance with said first motion, a circuit conducting the current generated in said armature, a separately excited electric motor for producing said second motion, a controlling generator of low magnetic saturation, the armature winding of said generator being connected to the armature winding of said motor, an exciting winding for said controlling generator, an exciting generator of low magnetic saturation having an armature and a field winding, the armature of said exciting generator being connected to said exciting winding and the field winding of said exciting generator being inserted in said circuit; means for so displacing the phase of the current in said field winding, that the phase of this current is in advance of the electromotive force generated in the armature of said first-named generator; and means for destroying the residual magnetism in said exciting generator.

The foregoing specification signed at Barmen, Germany, this 22nd day of November, 1913.

WILHELM LUYKEN. [L. S.]

In presence of—
  ALBERT NUFER,
  FRANCES NUFER.